United States Patent
Götz et al.

(10) Patent No.: US 8,597,751 B2
(45) Date of Patent: Dec. 3, 2013

(54) EASILY SPLIT ADHESIVE TAPE, ITS USE AND TOOL FOR ITS PRODUCTION

(75) Inventors: Kerstin Götz, Hamburg (DE); Klaus Kleinhoff, Rodenberg (DE)

(73) Assignee: tesa SE, Hamburg (DE)

( * ) Notice: Subject to any disclaimer, the term of this patent is extended or adjusted under 35 U.S.C. 154(b) by 737 days.

(21) Appl. No.: 12/091,236

(22) PCT Filed: Oct. 6, 2006

(86) PCT No.: PCT/EP2006/067145
§ 371 (c)(1),
(2), (4) Date: Jul. 8, 2008

(87) PCT Pub. No.: WO2007/048695
PCT Pub. Date: May 3, 2007

(65) Prior Publication Data
US 2008/0286533 A1 Nov. 20, 2008

(30) Foreign Application Priority Data
Oct. 24, 2005 (DE) .......................... 10 2005 051 181

(51) Int. Cl.
*B32B 3/02* (2006.01)
*B32B 3/06* (2006.01)
*B32B 7/12* (2006.01)
*B26D 1/00* (2006.01)

(52) U.S. Cl.
USPC .............. 428/40.1; 428/43; 428/57; 428/343; 428/906; 83/13; 83/30

(58) Field of Classification Search
USPC ............ 428/40.1, 43, 57, 343, 906; 83/13, 30
See application file for complete search history.

(56) References Cited

U.S. PATENT DOCUMENTS

| | | | | |
|---|---|---|---|---|
| 2,808,358 | A * | 10/1957 | Masse | 156/248 |
| 3,006,568 | A | 3/1960 | Willis | |
| 2,964,438 | A * | 12/1960 | Masse | 428/58 |
| 3,389,016 | A * | 6/1968 | Holtz et al. | 442/150 |
| 6,432,241 | B1 * | 8/2002 | Congard et al. | 156/157 |
| 6,726,706 | B2 * | 4/2004 | Dominguez | 606/228 |
| 6,841,337 | B1 * | 1/2005 | Speakman | 430/308 |
| 7,087,278 | B2 * | 8/2006 | Eikmeier et al. | 428/40.1 |
| 2005/0045265 | A1 * | 3/2005 | Pannell | 156/71 |
| 2005/0241228 | A1 * | 11/2005 | Weder | 47/72 |
| 2006/0099412 | A1 * | 5/2006 | Ross | 428/343 |

FOREIGN PATENT DOCUMENTS

| | | |
|---|---|---|
| CA | 2 039 631 C | 10/1991 |
| DE | 19 45 504 A1 | 3/1971 |
| DE | 38 34 334 A1 | 1/1990 |
| DE | 40 33 900 A1 | 10/1991 |
| DE | 92 01 286 U | 6/1992 |
| DE | 92 15 731 U | 4/1993 |
| DE | 195 44 010 A1 | 5/1997 |
| DE | 196 25 317 A1 | 1/1998 |
| DE | 196 32 689 A1 | 2/1998 |

(Continued)

*Primary Examiner* — Patricia Nordmeyer
(74) *Attorney, Agent, or Firm* — Norris McLaughlin & Marcus, P.A.

(57) ABSTRACT

The invention relates to a splittable adhesive tape (1) with a left-hand (l) and a right-hand (r) delimiting edge, wherein at least one of these two edges (l, r) is unstraight. The unstraight edge (l) has projections (V), which are rounded at their furthest projecting points (v).

18 Claims, 10 Drawing Sheets

(56) References Cited

FOREIGN PATENT DOCUMENTS

| | | |
|---|---|---|
| DE | 199 02 179 A1 | 8/2000 |
| EP | 1 022 245 A2 | 7/2000 |
| WO | 91 08159 | 6/1991 |
| WO | 95 29115 | 11/1995 |
| WO | 99 46196 | 9/1999 |
| WO | 02 44062 A | 6/2002 |
| WO | 02 056784 A2 | 7/2002 |
| WO | 03 029119 A1 | 4/2003 |

* cited by examiner splitting force profile (prior art)

EASILY SPLIT ADHESIVE TAPE, ITS USE AND TOOL FOR ITS PRODUCTION

This application is a 371 of PCT/EP2006/067145, filed Oct. 6, 2006, which claims foreign priority benefit under 35 U.S.C. §119 of the German Patent Application No. 10 2005 051 181.3 filed Oct. 24, 2005.

The invention pertains to an adhesive tape having a longitudinal extent, the tape having been optimized such that, after it has been bonded, it provides effective transmission of those forces which, within the plane of the adhesive tape are oriented substantially transversely in relation to its longitudinal extent, whereas, with respect to forces in the direction of the adhesive tape's thickness, in precisely the opposite way, failure at extremely low levels of force is a desideratum.

The particular difficulty of this objective lies, therefore, in the mutually opposed nature of the two strength requirements. While it has long been familiar to the skilled worker to produce weak adhesive tapes, and it is also familiar to him or her to produce strong adhesive tapes, it has long been alien to the same worker to produce an adhesive tape which is both strong and weak.

This divergent requirement nevertheless exists for those adhesive tapes which are intended to effect roll fastening during the execution of what is called a flying splice.

Flying splices are implemented in the production, finishing, and processing of thin web materials—more particularly paper. The adjective "flying" expresses the fact that this splicing—that is, joining—is carried out with the respective manufacturing line at its full operating speed. The paper web speed in paper producing machines presently is typically more than 100km/h, with the fastest even permitting 130km/h.

The reason why splices become necessary in paper finishing and paper processing is that, even with the gigantic dimensions of paper rolls that are nowadays the norm (up to 9 meters wide and 2.5 meters in diameter), even these rolls expire at some point. It is therefore necessary to replace an unwound roll by a new one—in papermaking, the similar requirement comes about as a result of the fact that even the largest roll is full at some point in time.

In order to illustrate why in many fields of application it is required that splicing be performed on the fly, the finishing of a paper web by coating will be selected below as an example. The coat thickness achieved depends not only on the distance between the face of the base paper and the lower edge of the coating knife, but also on the speed at which the paper web is drawn through the coating slot: Faster drawing leads to a lower coat thickness. However, this decrease in coat thickness is a function not only of the web speed but also of the propensity of the paper web to be wetted, and the viscosity of the coating slip. The viscosity, in turn, is a function of the temperature, which is influenced, again, by the web speed. In short: a consistent quality coating is achievable only if the key influencing parameters are kept constant, including, more particularly, the web speed. However, if the web cannot be braked in order to allow a splice to be performed, then the splice must in fact be performed at full web speed.

In the same way as for the full-area coating dealt with above, keeping all the key influencing parameters constant is also an aim in the case of part-area coating. Commercially the most important instance of part-area coating is printing, whether that be of wallpapers, books or magazines. Among the various printing methods, gravure printing proves to be particularly demanding for splicing, since it is normally done on high-gloss paper which, in the high quantities typically required for magazines, can be provided economically only by virtue of the fact that it includes ingredients which cause the paper to become "brittle", in other words which adversely affect its capacity to absorb short impulses without suffering damage. What is needed here, then, is particularly uniform splicing—that is, low-impulse splicing.

In order to bring about extremely low-impulse splicing of the radially outer end of the new roll (its start, so to speak) to, for instance, the end of the expiring roll, in processing and on the input side in finishing, it is necessary, in a way which is known per se, to accelerate the new roll to a rotational speed which is such that its peripheral speed corresponds to that of the web speed of the old web. During this acceleration, the radially outer end is pushed by the slipstream and loaded by centrifugal forces. The purpose of the roll fastener specified at the outset is to allow the paper roll to withstand these forces and not to "explode". The roll fastener consists essentially of an adhesive bond between the last end of the new roll and the next layer situated beneath it. In view of the high speed of 130km/h, it is understandable that the high slipstream and centrifugal forces which occur necessitate a considerable fastening strength.

However, at the very moment the desired flying splice has come about, the roll fastener, formerly so important, is now a disruption, hindering the going-on of the new roll and its unwind. From this moment on, an extremely low fastening strength is desired.

In the attempt to reconcile the sharply divergent requirements—first high strength, then low strength—U.S. Pat. No. 3,006,568 teaches a splitting mechanism, but one which is on an additional element, which is of three-layer design; cf. more particularly column 3, line 6, last word to line 11 and also the four figures. The publication WO 91/08159, which is about 30 years more recent, proposes splicing the rolls using a double-sided adhesive tape which is intended to split when the fastening is opened. The fact that no additional intermediate elements are required for this purpose, as was assumed by the aforementioned US patent, is already disclosed therein. This is followed, in terms of content, by DE 195 44 010 A1.

Whereas the stated citations still describe the use of pointed labels, i.e.; short, wide sections of adhesive tapes which have been attached to the point or points of starting edges, cut in V or W or multi-V shapes, of the radially outer ends of such web rolls, the later German utility models U 92 01 286 and 92 15 731 disclose adhering an adhesive tape substantially transversely over the new roll. The carrier proposed therein for the adhesive tape is a film. The more recent of the two describes a splitting mechanism in a foil composed of two or more layers for the purpose of opening the roll fastening. Claim 5 thereof proposes a "special shaping" of one or both edges of the multilayer adhesive tape: "for example, jagged". As another possibility of uniting roll fastening and splicing function in one product, U 92 01 286 teaches, in claim 5, adjusting the adhesive on the bottom side of the adhesive tape such that it is no longer capable of attaching after having been once attached. Although it is also left open as to precisely how this nonsticky leaving-behind is to be achieved, the objective is nevertheless already disclosed there: the appendant claim 6 proposes adhesives "corresponding to the notepads and sticky labels".

According to publication WO 95/29115, the "third" adhesive layer therein, which is intended to fasten the roll, is to be designed "for releasing at least said splicing portion from said underlying winding of said roll while leaving the outer surface of said underlying winding in a non-tacky condition." While claims 2 to 4 propose weak or repositionable or stretchrelease adhesives, the aim according to claim 5 is to use an aggressive pressure-sensitive adhesive.

In contrast, the laid-open specifications DE 196 28 317 A1 and DE 196 32 689 A1 are directed again to the earlier proposals of opening the fastening, after splicing has been achieved, by splitting. In this case, splicing function and fastening function are combined in one product, and the carrier to be split is composed of paper. DE 199 02 179 A1 develops this idea further by adhering this splitting strip to the adhesive splicing tape with a defined offset.

As the complex ideas acknowledged in the last paragraph have meanwhile been able to obtain very wide propagation, a number of well-known, competing adhesive tape manufacturers have attempted to establish multilayer splitting systems: in this regard, see, for example, publications WO 99/46196 and WO 2002/0056784.

The present invention follows the splitting concept for the opening of the roll fastening, and deals with the problem of further increasing the distance between intended high strength during acceleration and intended low strength at the instant of opening the fastening.

Prior art that might appear to be relevant includes Canadian publication CA 2 039 631 and its priority-substantiating German patent application DE 40 10 704, which in FIG. 14, to which claim 5 appears to belong, teaches a non-straight-line adhesive edge; the subject in question, however, is the tearing of the paper along a perforation and not, therefore, as a result of a load pointing in the direction of the paper's thickness. The content of the same applicant's DE 40 33 900 is similar.

Considered the closest prior art is the aforementioned German utility model A 92 15 731, more particularly claim 5. It describes a "roll adhesive" said to be characterized in that one or both edges of the "multi-layer film" are not parallel but instead are specially shaped—for example, of jagged design. Starting from this basis, the problem which arises is that of specifying edge contours for splittable adhesive tapes that despite a high fastening strength allow the fastening to be opened very easily.

As already proposed in German utility model G 92 15 731, experiments were conducted within the applicant company using a jagged edge profile. For a person of ordinary skill in the art, this design suggests itself not only on account of the particular ease with which it can be described but also since it corresponds the most precisely to the older V-shaped and later multi-V-shaped adhesive bonding. Practice, however, has shown that the obvious assumption that the design occurred to complete evening-out of the paper strength to be overcome over time was incorrect, and that instead each jagged edge of the splittable adhesive tape led to a deterioration in relation to the existing embodiments of otherwise the same splittable strip with straight edges on both sides. Beyond the fact that the average values of the desiredly high splitting resistance and in particular of the desiredly low opening resistance were by no means more favorable, the fact was, in particular, that the fluctuations around these average values achieved in each case were greater. These results led to the long-lasting rejection of this idea by those in the art.

The proposition of the invention is that the first negative experimental results were caused not by the deviation from straight-linearity per se but in fact in the jaggedness. Further, it has been assumed that, more particularly, the sharp point at the leading end of each jag is a disruption, and it has therefore been proposed, as the most important element of the solution provided by the invention, that the projections of the adhesive tape which is to be applied, approximately, axially to the roll to be attached—this is generally a paper roll, but could also be a polymeric film or metal foil or the like—that are intended to accelerate the roll to be attached in the course of rotation are rounded—that is, are specifically not sharply angular. This rounding could also be referred to as a continually differentiable flattening, as a consequence of which there is a tangent parallel to the overall longitudinal extent of the adhesive tape on each projection.

It has now proven possible to show, in laboratory experiments, that the proposed rounding of the leading regions does in fact lead to a reduction in the initial splitting force and thereby reduces the impulse to be absorbed in the freshly assembled web at the moment when the roll fastening is opened. As a result, there ought now to be a further reduction in the rate of tears on the particularly sensitive gravure paper. This welcome result is surprising for those of ordinary skill in the art, since the previously known deviation from straight-linear adhesive tape edges, namely a jaggedness, led—in quite the opposite way—to a deterioration.

Another reason why this solution was not obvious was that it involved for the first time renouncing the earlier objective of complete evening-out of the tension force acting on the freshly joined paper web. The invention satisfies itself with the objective of reducing the maximum force impulse; this more modest objective, however, is reliably achieved.

The explanation for the deleterious effect of the previously known angular design of the known corrugation is that the aim is in fact not for the splittable paper to tear as a result of forces in the peripheral direction of the paper roll (as in the case, for instance, of DE 38 34 334 A1 as per FIG. 5, or CA 2 039 631 [from DE 40 10 704 of Voith], more particularly claim 5 therein in conjunction with FIG. 14); not, therefore, a plane of tearing which is tensioned by an axial plane and a radial plane, but instead tearing as a result of forces in the radial direction of the paper roll, in other words a plane of tearing which is tensioned by the peripheral direction and the axial plane. For this purpose, however, it is necessary first of all to construct a sufficient area, which only then produces the necessary tearing force (in this specific direction also called "splitting force").

Indeed, at the edge of the adhesive tape that leads with respect to the running direction of the web to be joined, the existing jagged point gives rise to the problem that at that point—owing to a lack of extent in the running direction of the web (i.e., adhesive tape width) and in the cross-direction of the web (i.e., adhesive tape length)—there is hardly any bond area that would be able to develop the necessary initial force in order to generate the desired start of a tangential tear that would be the necessary precursor to further splitting. On passage through a jag point of this kind, the straining bond area would then increase quadratically; however, in that case it would no longer be possible precisely to check when the split resistance was overcome, and up to that point there would already have been some deformation energy absorbed in the joined web, this energy being discharged at the instant of splitting. A mechanism determined by force, such as this, then, would be associated with substantially greater scattering—owing to the elasticities and plasticities and inertias inbetween, along with all their fluctuations (paper is a natural product)—than, for instance, a system determined by a geometry. The decisive advantage of the solution provided by the invention is that the (desired) failure of the splittable paper truly lies right from the beginning securely in splitting, and no other failure modes can occur at the beginning.

By means of the design requirements according to the invention it has been possible to provide a substantial improvement.

Of course, the extent to which the amplitude of the waviness, proposed here, for the edges of the splittable adhesive tape can be taken is not arbitrary, since this splittable adhesive tape must indeed still be amenable to handling in its further processing—more particularly in its uniting with an adhesive tape of this kind which is intended to bring about the join between the end of the expiring web and the start of the new web. If no adhesive transfer tape is utilized for this handling, then the amplitude is appropriately not more than one third, more preferably approximately one fourth, of the width of the adhesive tape. The straight-through residual strand width of the adhesive tape which remains in the first case is one third of its overall width, in the second case half of its overall width. If an adhesive transfer tape were to be used which indeed to a certain extent splints the sensitive splitting strip, it would also be possible to select greater amplitudes.

The risk of creasing during handling, however, is also influenced by the "wavelength", which means the distance from leading tongue to leading tongue: the greater this wavelength, the greater the creasing. Wavelengths anticipated to be appropriate are those between 0.6 and 2.4 times the width of the splittable adhesive tape.

It is of advantage, furthermore, to produce the splittable strip of the invention from a particularly easily split material and to make a transition from the presently customary width for the splittable strip, of approximately 10 mm, to approximately 12 to 14 mm.

Furthermore it is advisable, in accordance with claim 2, for the nonlinear edge, at its furthest-recessed points (z), to be likewise of rounded design, but for the curvature at these points to be substantially sharper than at the projecting points. With regard to further particularization of the term "substantially" in the preceding sentence, it is noted that, in the interest of optimum space utilization, the radius of curvature at the most leading (i.e., projecting) point of each projection ought to be twice as great as at the most trailing (i.e., recessive) point of the same edge, with further preference five times as great; an exactly sharp angle, however, ought to be avoided even at the recessive point, in order not to lose handleability in the production operation as a result of an excessive notch effect when the adhesive splicing tape is loaded in its longitudinal extent. In a manner similar to that already set out in the discussion of the appropriate amplitude, it is possible, in the case of "splinting" of the splittable adhesive strip by a transfer tape, to select a particularly small radius of curvature at the most recessive point, as a result of which a little more room is made for the design of the projecting region and at that point a somewhat larger radius of curvature is made possible.

The inventive transition from a zig zag to a wave automatically results in an inflection point being located on each flank of a projection. Further theoretical considerations lead to the derivation that a slightly S-shaped course of the flanks would necessarily lead to the optimum distribution of tensile force and hence continuation of the fastener opening. Consequently claim 3 recommends that the nonlinear edge be continually differentiable between a widest projecting point (v) and the furthest-recessed point (z) situated closest to it, with three inflection points.

The standpoints of the optimum division of space which have already been described in relation to the optimum dimensioning of the radii of curvature in the extremes of the wave contour, also result in a situation in which, preferably—as taught in claim 6—the negative of each recess (Z) is of narrower design than the positive of an adjacent projection (V).

By virtue of the invention it is also possible to even out further the profile of splitting force, and more specifically to do so, in accordance with claim 7, by the nonlinear edge having two or more families ($V_1, V_2$) of projections (V) which project to different extents in accordance with a regular pattern. Splitting begins earlier at the further-projecting projections than at the lesser-projecting projections. The actual beginning of splitting, however, requires more force than the continuation of splitting which has already begun. Thus, although the number of impulses is increased (doubled in the case of two families, trebled in the case of three, and so on), their respective amount is lowered.

The invention, it is true, has come about substantially as a result of deeper penetration of the mechanical events involved in initiation of splitting. This initiation takes place following substantial axial application to the roll that is to be fastened—irrespective of whether it has been united beforehand (as is preferred) with an adhesive splicing tape or not—at the edge which is then leading. In accordance with the invention, furthermore, the trailing edge is designed in a way which is harmonized with this. If that edge were to remain straight, the splittable adhesive tape would have at least one of the two following possible disadvantages:
a) an excessive width of adhesive tape in the region of its projections, and hence an excessive input of energy for executing the splitting, or
b) an inadequate width of adhesive tape in the region of its recesses, and hence opening of the roll fastener beginning at those points even during the acceleration process.

Disadvantage b) would be fatal, and disadvantage a) would devour at least a major part of what had been won in the better distribution of initiation of splitting. In order to avoid this, claim 8 recommends that both edges of the adhesive tape be nonlinear, with the same period length. Appropriately there is no phase offset between the two wave-shaped edges.

With an appropriate harmonization of amplitude between the leading and trailing waves, it is possible to set the smallest-possible tape stretch impulse during opening of the roll fastener. The optimum is situated approximately at the point where the amplitude at the trailing edge is approximately 85% of that at the leading edge. A mathematically very good and very simple solution would be to use the same function for the trailing edge as for the leading edge, but with the amplitude multiplied by a factor of 0.85.

In order to produce in this way, however, it would be necessary to accept the fact either that
a) in the slitting of the individual tapes from the master tape (which is appropriately produced in a width of between 0.5 m and 4 m, as a precursor product), waste is formed and, moreover, 2 slits per tape are necessary,
or that
b) the wave function is point-symmetric—although this prevents a differentiation in curvature between projection and recess—and that the punching roll, in alternation along its axial plane, has one punching ring of high wave amplitude and one punching ring of low wave amplitude; then, furthermore, from the set of individual adhesive tapes produced, either (counting through in the axial plane) the first, third, fifth, seventh and so on are taken out and turned once about their longitudinal axis, or else the second, fourth, sixth, eighth and so on, so as to have produced again, at the end, a set of equal individual adhesive tapes situated co-directionally alongside one another;
furthermore, they ought to be pulled apart axially somewhat, after which the individual strips of splittable adhesive tape can either be wound up as they are and supplied for the purpose of (separate) roll fastening or else—as preferred—they can be assembled (in the jargon, "married") using an adhesive tape which produces the connection between the old and new webs.

(As an alternative to the rotation of the individual tape, it would of course also be possible first to carry out winding (in other words, not to marry directly) and then to turn over every other roll.)

Since, however, the anticipated optimum in the amplitude dimensioning of the wave form for the shaping of the leading and the trailing edges (100% to 85%) is very shallow, it is advisable, in accordance with claim 9, to cause the leading and the trailing edges of the adhesive tape to run parallel to one another, so that despite the nonlinearity of the two adhesive tape edges the width of the adhesive tape is the same everywhere. For this modification, all of the punching rings of the punching roll are identical.

In the case of this kind of design
relative to a)
waste is avoided, which lowers the material costs, and only one cut is needed per individual strip (apart from the last individual strip) of the splittable adhesive tape, which halves the cost both of maintaining and of acquiring the punching rings, and
relative to b)
the design of the projections can be blunter and flatter than that of the recesses, and also the cost and complexity of having to turn every other tape is avoided.

These advantages are considered so great that, with recourse to this solution, all of the exemplary embodiments that are shown in more detail later on have the leading and trailing edges designed identically.

For the production of a splittable adhesive tape of this kind, first of all, in a way which is known per se, a master tape would be produced, in other words a very wide splittable paper tape would be coated on at least one side with a self-adhesive composition. This would be able at the end to lead to a product according to claim 11. Departing briefly from the main concept, this will be elucidated further:

In contradistinction to the adhesives which were to be made tacky by wetting with water (like the coating of the backs of postage stamps) or the glues for application by the user that still prevailed until the middle of the 1970s, this leads to an application to the new paper roll to be joined onto the old web that is substantially easier and less susceptible to fault from the customers' standpoint. It also prevents the migration of water into the paper to be joined, which can lead there to creasing and a drop in strength, and which would therefore increase the likelihood of tears. Appropriately the at least one-sided coating with adhesive, as soon as it has been produced, is covered with a liner (e.g., siliconized paper) in order to prevent contamination prior to the use of the product at the premises of the end customer.

In the application of the product this self-adhesive side pointing radially inward belongs to the new roll to be prepared for splicing.

Preferably this splittable adhesive tape is affixed ("married") to a further (but non-splittable) adhesive tape which produces the actual join to the old web. This fixing may take place in any desired way: for example, by means of a strip of adhesive arranged on the corresponding underside of the non-splittable adhesive tape, or by an application of adhesive to the second side of the splittable adhesive strip, this adhesive preferably being of self-adhering type (since for an adhesive tape manufacturer self-adhesive compositions are particularly readily available), but may also be of curing design.

Returning to the main concept: after this coating, furthermore, in a way which is known per se, this very broad adhesive tape, splittable in the paper carrier, would be slit into a multiplicity of narrow adhesive tapes. It will be appreciated that in order to produce splittable adhesive tapes of the invention these "slits" must no longer be linear, which is why the roll knives customary to date are unsuitable. In the somewhat more distant future, within an inert gas atmosphere, it would be possible to contemplate "slitting" with a laser—possibly pulsed in order to reduce the water smoke, with, appropriately, the family of laser beams being moved periodically transversely to the direction of advance of the adhesive tape, appropriately (on account of its low mass and therefore its high reproducibility of operation even at high speeds of advance) by means of an adjustable mirror; in that case it is not necessary to have one per cutting beam, since a joint, adjustable one is also suitable. —With easier management of the explosion risk and fire risk, however, nonlinear "slitting" is also possible with punching dies; particular preference is given to a continuously rolling punching roll with correspondingly wave-shaped punching rings.

Although in recent time competitors have revived the intrinsically old idea—namely that of sticking together a splittable paper from two paper layers and arranging the splitting in the bondline, in other words not within the paper material—through a further development of the bond from a single-layer bond to a three-layer system of the barrier layer/adhesive layer/barrier layer type, what is now desired, specifically, is a highly anisotropic behavior in order to facilitate splitting, which is best achievable with fibrous materials, and so the splittable adhesive tape of the invention, according to claim 10, ought preferably to have a carrier (2) produced in one piece from paper, as is likewise already known (DE 196 28 317). In that case the splitting will preferably take place approximately centrally in the one-piece-produced paper. It is true that this requires great experience and tight quality monitoring in order to achieve a constant splitting strength; ultimately, however, the applicant is convinced that this is more reliably achievable in a line manufacturing process which has left its pioneering phase long behind it than to produce a composition from far too many individual parts, which would more closely resemble a pioneering phase. Nevertheless, however, the invention can also be employed in conjunction with the less-promising multilayer splitting systems.

The invention is illustrated in more detail below with reference to a number of figures. In the figures.

Figure 1:
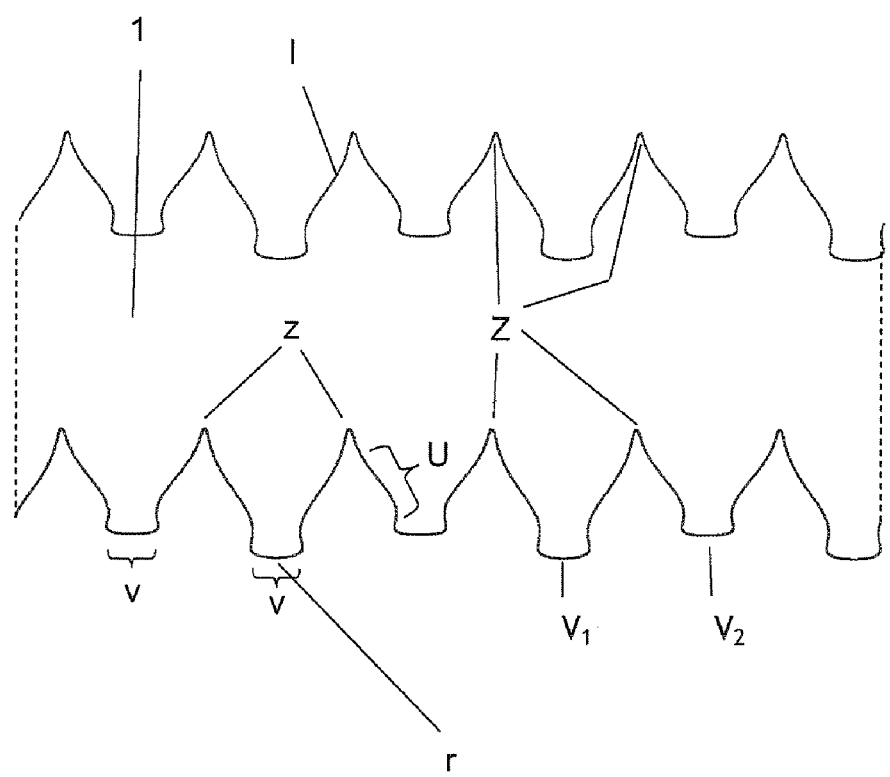
FIG. 1 shows, in a plan view to scale, an adhesive tape with inventive wave shape at both its edges, the wave shapes being the same at both edges, and the projections being grouped into two families.
Figure 3:
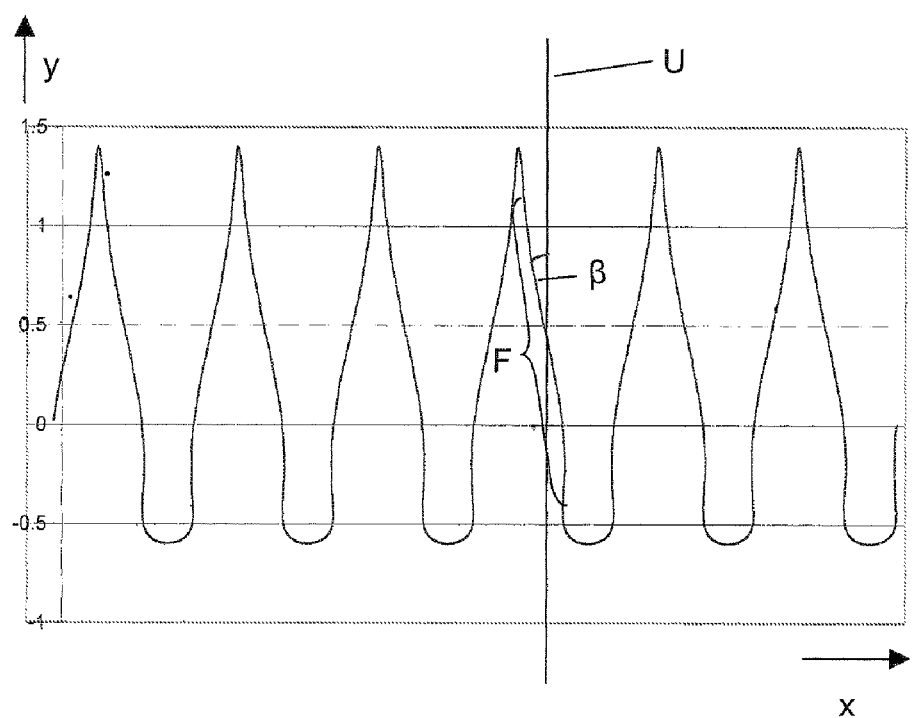
FIG. 3 shows, in the same way as FIG. 2, a wave shape of this kind in which all of the projections are situated "synchronously"
Figure 5:
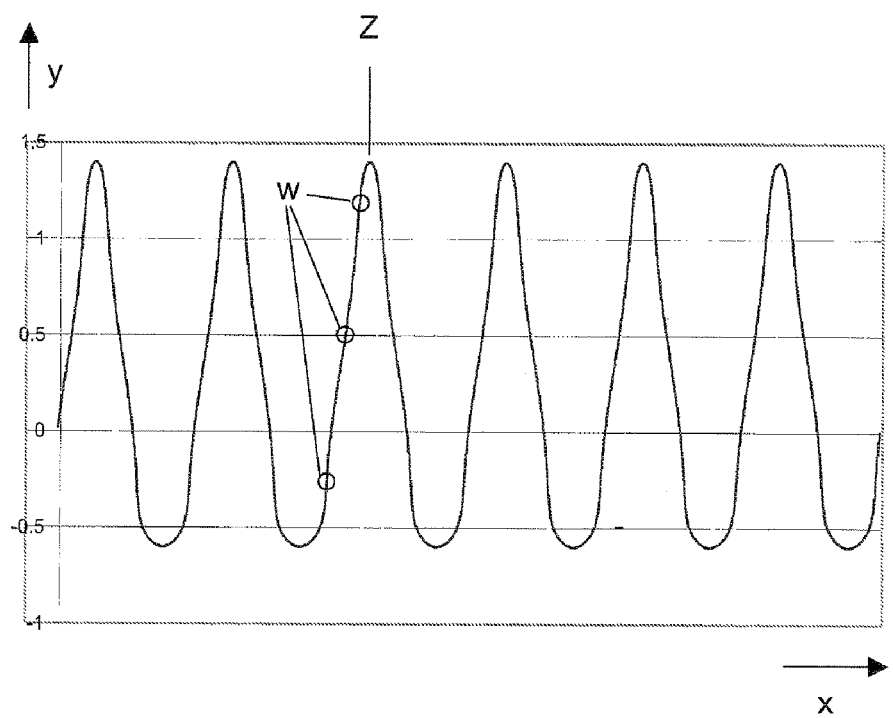
FIG. 5 shows a modification of the wave shape according to FIG. 2 wherein the rounding in the recesses is greater.
Figure 6:
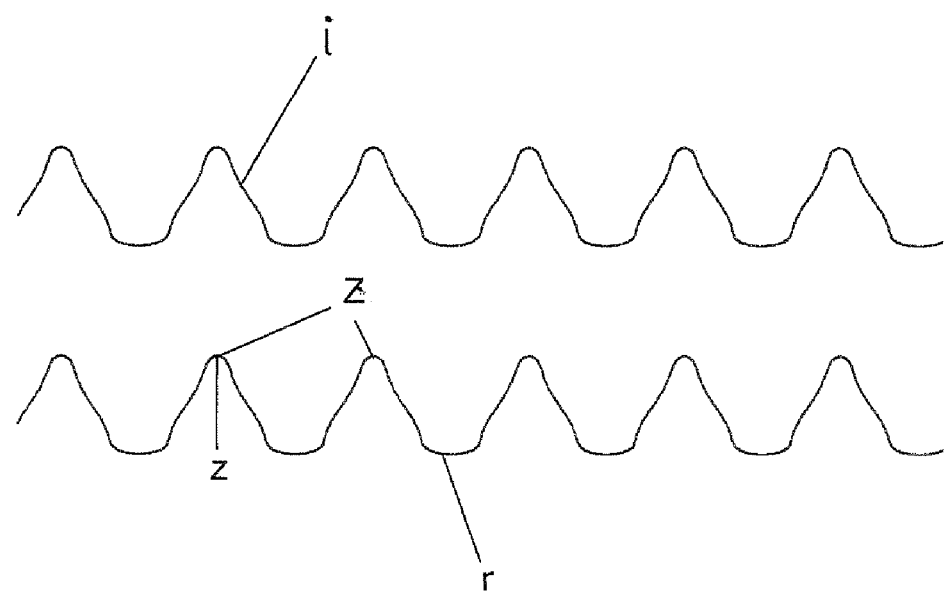
Figure 7:
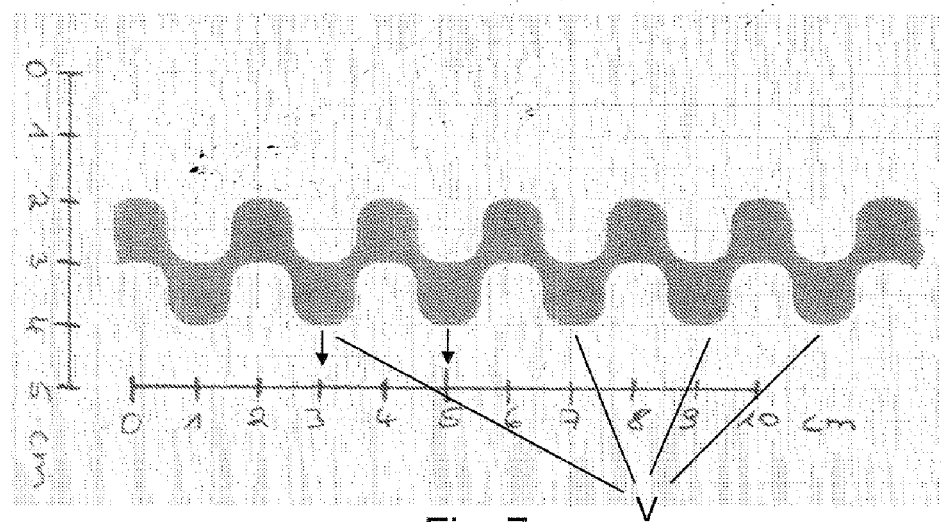
Figure 8:
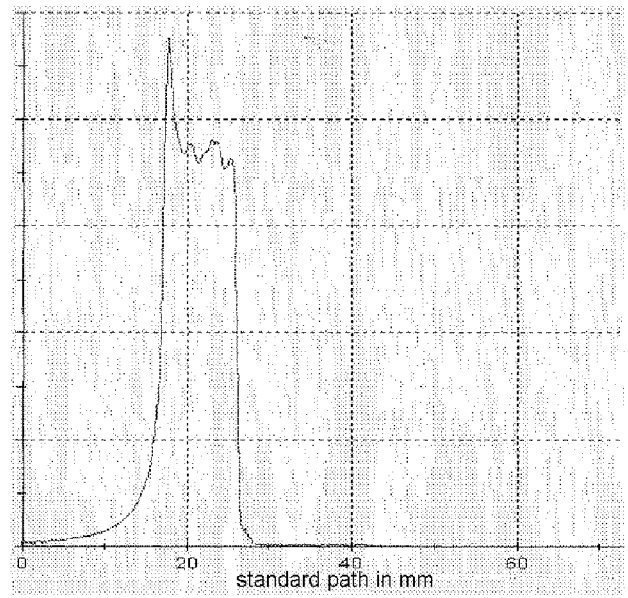
Figure 9:
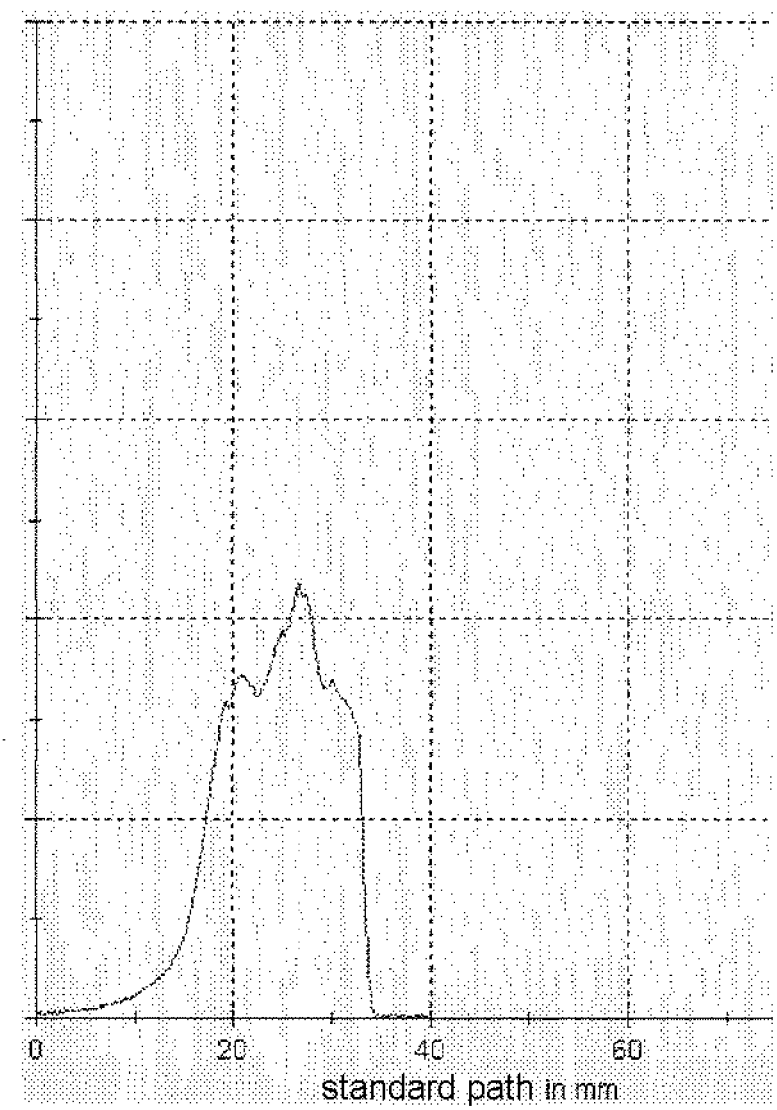
Figure 10:
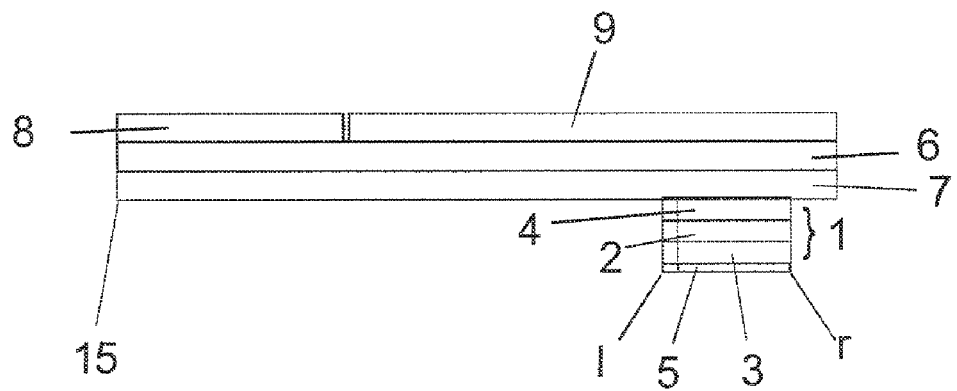
Figure 11:
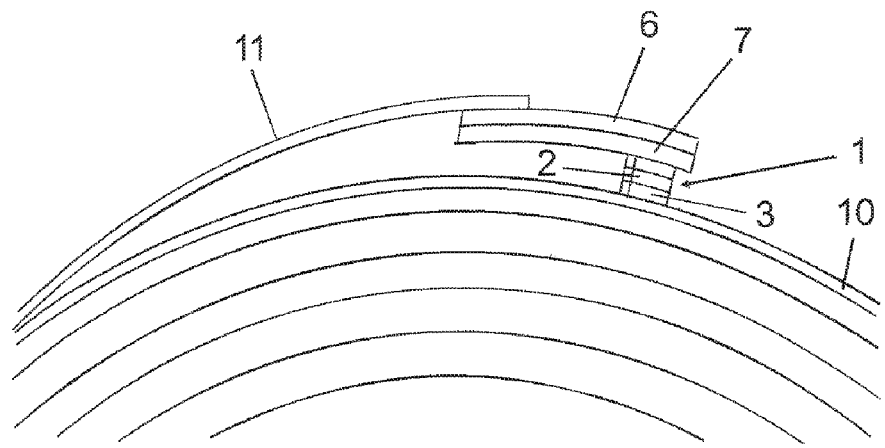

FIG. 6, in the same way as FIG. 1, in a plan view to scale, shows an adhesive tape with edges in accordance with the curve from FIG. 5;

FIG. 7 shows to scale, in a plan view, an inventive specimen, its wavy edges having a course which is simpler to describe mathematically;

FIG. 8 shows, in a diagram, the splitting force of a paper strip over the path, the paper strip having straight edges (prior art);

FIG. 9 shows, in a diagram, in analogy to FIG. 8, the splitting force profile for a paper strip which has wavy edges but is otherwise the same as that from FIG. 8;

FIG. 10, in a sectional end-face view which is not to scale, shows an inventive adhesive splicing tape equipped on its underside with an inventive splittable adhesive tape having wave-shaped edges; and FIG. 11 shows, in a view from one side, not to scale, a new paper roll whose start has been prepared for flying splice to an old, expiring paper web, this having been done by application of an adhesive splicing tape according to FIG. 3.

FIG. 1 shows in a plan view true to scale an adhesive tape 1 with inventive wave shape both on its left edge 1 and also at its right edge r. These terms "left" and "right" come from the world of the production of this splittable adhesive tape; in the intended application, therefore in an at least substantial bonding in the axial direction to a new roll which is to be accelerated to a synchronous peripheral speed, one of the two sides then becomes "leading" and the other becomes "trailing"; in each case, the edge with its flatter, more rounded projections—in this case the right edge—will be the leading edge.

In the case of the most preferred embodiment of the invention, in accordance with FIG. 1, the projections V are grouped into two families $V_1$, $V_2$; the projections $V_1$ project further than the projections $V_2$.

Particularly important in comparison to the older jagged shape is that the frontmost region v of the projections V is rounded, so that, rather than a spike running into the zone of the beginning of splitting, there is instead a blunt or even a flattened zone. Appropriately the bluntness or flattening should be somewhat more pronounced on the frontmost regions of the less-projecting projections $V_2$ than on the frontmost regions of the further-projecting projections $V_1$.

To be arranged somewhere behind the phase of the beginning of splitting, which has increased greatly in reliability as a result of the inventive design—irrespective of whether it is now referred to as spike rounding or spike flattening—is the region which is responsible for further splitting over the entire width of the new roll. In this region the edge must run obliquely, i.e., not only in the peripheral direction of the new roll. In order to allow the impulse due to the beginning of splitting to subside to some extent before the additional load for further tearing is initiated, it is advisable additionally to arrange a small transition region between the region of the beginning of splitting and the region of further splitting, the additional load of further tearing being at least reduced in said transition region, as a result of a lesser degree of edge incline relative to the peripheral direction; in the FIG. 1 elucidated here, this transition region ü is in fact so strongly pronounced that, here, the edge has a slightly inverse incline, with the consequence that the progress of the splitting width over the peripheral direction of the new roll whose fastening is just opened is therefore not only reduced but, the splitting width even falls back slightly. In this way a characteristic slight contraction is formed behind the frontmost region v of each such projection V.

In contradistinction to the projections V, which here protrude in two different extents, the extremes z of the recesses Z (which of course appear at the trailing edge 1 as projections) are flush with one another. —Of course, although not shown here, it would be possible further to develop the design into even greater numbers of families of projections which extend to different levels—for example, three projections $V_1$, $V_2$, and $V_3$—in order to provide more effective distribution of the impulse. Appropriately there are then two families of recesses of different width, $Z_1$ and $Z_2$. The number of recess families ought always to be one lower than the number of projection families.

Figure 2:
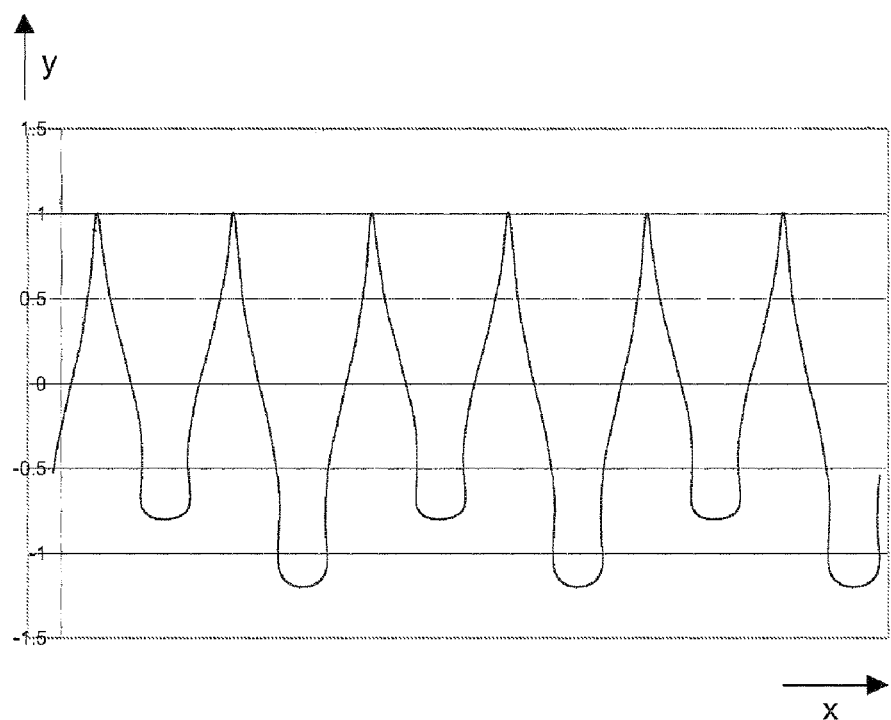
FIG. 2 shows, in a diagram, the wave shape from FIG. 1 in isolation, but with an enlarged scale in the y direction in relation to the x direction.

FIG. 2 shows, in a diagram, the wave shape from FIG. 1 in isolation, but with an enlarged y-axis scale in relation to the x-axis. This wave shape, owing to the stated contraction in the intermediate region, cannot be represented as a function y(x); instead, y(x) is only a relation. Irrespective of whether the inventor sees the technical optimum of the wave form in a not-so-great extent of the transition region through to a contraction therein, the mathematic description, in terms of its conviction, must nevertheless be such that such a description can be produced without problems. This is achieved by the inventor by introducing a parameter—designated "α" and defining not only y but also x as a function of this parameter, and, at the end, showing y over x, in other words the relation y(x).

In that case (with a given in degrees)

$$y(\alpha)=\sin(\pi/180\cdot\alpha)\cdot(1+h\cdot\sin(i\cdot\pi/180\cdot\alpha))-h+j\cdot\sin(l+\pi/180\cdot\alpha k)$$

where
  j=0.2
  h=0.4
  i=1
  l=−π/4
  k=2
and $$x(\alpha)=\alpha+a\cdot(1-b\cdot\cos(c\cdot\pi/180\cdot\alpha))+d\cdot(1-e\cdot\cos(f\pi/180^*\alpha))$$

where
  a=1.2
  b=16
  c=3
  d=0.4
  e=12
  f=5

FIG. 3 shows such a simplification of FIG. 2, in which the projections V are all located in a single flush line. In this case (with a given in degrees)

$$y(\alpha)=\sin(\pi/180\cdot\alpha)\cdot(1+h\cdot\sin(i\cdot\pi/180\cdot\alpha))$$

where
  h=0.4
  i=1
while the function for x has remained unchanged, viz.

$$x(\alpha)=\alpha+a\cdot(1-b\cdot\cos(c\cdot\pi/180\cdot\alpha))+d\cdot(1-e\cdot\cos(f\pi/180^*\alpha))$$

where
  a=1.2
  b=16
  d=0.4
  e=12
  f=5

Figure 4:
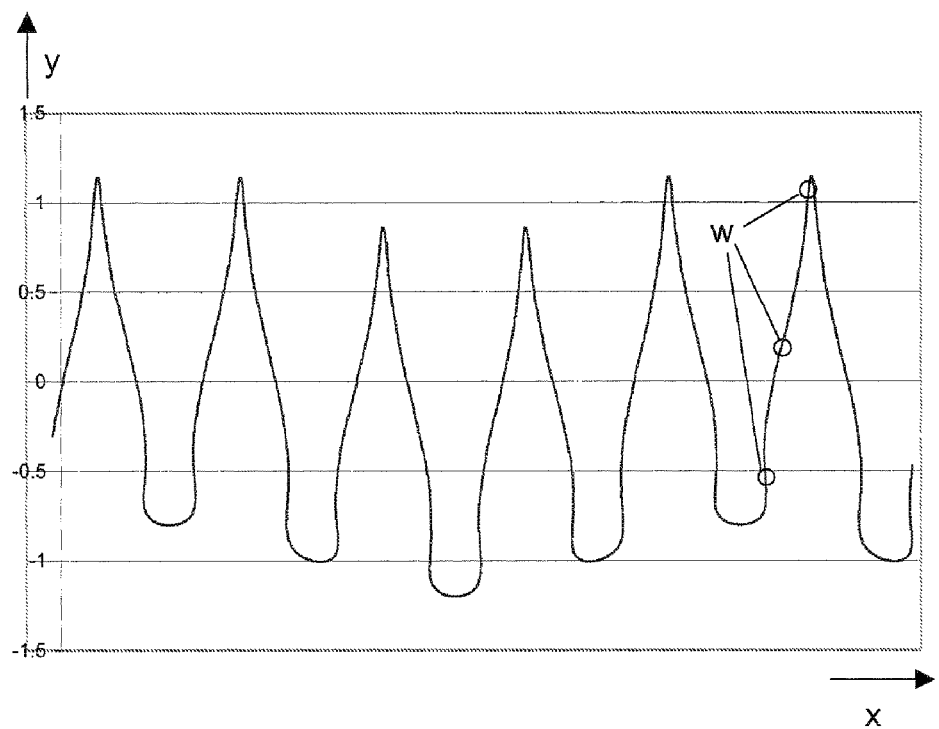
FIG. 4 shows a modification of the wave shape according to FIG. 2 in which the projections (of the leading edge) have been grouped into three families.

For the purpose of better distribution of the impulse due to the beginning of splitting, it is of course possible to generate three families of projections, in the manner, for example, shown by FIG. 4. In order to obtain this relation, the functions are as follows:

$$y(\alpha)=\sin(\pi/180\cdot\alpha)\cdot(1+h\cdot\sin(i\cdot\pi/180\cdot\alpha))-h+j\cdot\sin(l+\pi/180\cdot\alpha/k)$$

where
  j=0.2
  l=π/8
  k=4

The type of function, therefore, is the same as that of FIG. 2, but with different values used for 1 and k.

Meanwhile, here again, the function for x has remained unchanged, viz.

$$x(\alpha)=\alpha+a\cdot(1-b\cdot\cos(c\cdot\pi/180\cdot\alpha))+d\cdot(1-e\cdot\cos(f\cdot\pi/180*\alpha))$$

where
 a=1.2
 b=16
 c=3
 d=0.4
 e=12
 f=5

On one of the flanks, for the purpose of illustration, the three inflection points w are marked. The most greatly recessed of these three inflection points is already almost at the lowest site on the recess. It will be understood that, if one wished to take this to the point, in the truest sense of the word, this point of inflection would come to lie exactly at the lowest site of the recess and would then coincide with the most greatly recessed inflection point of the flank following next.

FIG. 5 shows a modification of the wave shape according to FIG. 3 such that the rounding in the recesses is greater. This results in greater ease of application of the adhesive splicing tape produced using a splittable adhesive tape equipped with such edges to the new roll initially to be fastened therewith, which is thereafter to be accelerated to a speed synchronous with the old, expiring web. The reason for this greater ease of application is the reduced notching effect on the outermost sites z of the recesses. The operative preparing the splice in fact stresses the adhesive splicing tape, for the purpose of crease-free application, somewhat in its longitudinal direction, in other words in the axial direction of the roll to be fastened. The slight stretching which occurs during this stressing leaves even the splittable adhesive tape bonded underneath, with its inventively wavy edges, not entirely unaffected, and consequently there is a certain concentration of stress at these notchlike recesses: the narrower the radius of curvature there, of course, the more marked this concentration is.

Furthermore, to the manufacturer of adhesive splicing tape, a gentler, less sharp curvature facilitates the marriage between the lower splittable system and the upper adhesive joining tape; indeed, even during this conjugal adhesive interbonding, there will generally be a certain tensile stress to be accepted.

Here again, by way of example, the inflection points are shown on one of the flanks. In this case, for substantially smoother curvature at the recesses Z, the point of inflection lying the furthest back is at a distinctly greater distance from the extreme of the recess. It is noted, furthermore, that in this case the change of curvature at the middle inflection point is much smaller than in FIG. 4. The resulting, almost linear design of the middle region of the flank is appropriate for splitting material comprising paper grades of this kind which show relatively little difference between the initial splitting force and the force required for split propagation.

The price for less sharp recesses, of course, is a narrower design of the projections, with a somewhat reduced flattening there, and/or a sharper flank incline in the region of the propagation of splitting. The optimum compromise is something which the person skilled in the art is able to determine for the particular web material to be joined, by means of a series of experiments.

In this paragraph the aim in principle is to describe how the nature of the web material that is to be joined affects the situation: in the case of very sensitive, brittle web material, as in the case, for example, of thin, mass-produced, high-gloss paper for magazines, a somewhat greater sensitivity requirement on the part of the personnel preparing for the splice will be accepted for a decidedly sharp design of the recesses, and the space won in this way will be used for a particularly gentle beginning of splitting and/or propagation of splitting—in other words, projections will be rounded/flattened to a greater extent and/or flanks F will incline with a smaller angle β relative to the peripheral direction U (see, for instance, FIG. 3).

For more robust and/or less rapidly processed paper, in contrast, it is also possible to accept a greater stress impulse due to the beginning of splitting, and, in return, projections of narrower design and/or greater flank angles β will be used, and consequently more greatly rounded recesses will be won, with easier production and application of the adhesive splicing tape having a splittable system—in other words, in general, a splittable adhesive tape—having edges waved in accordance with the invention.

In order not to conceal the essence of this variation by other variations, and more particularly not the question of the number of families into which the projections should be grouped, in this case all the projections V are situated in a single flush line.

The equations which generate this curve are unchanged (with α given in degrees):

$$y(\alpha)=\sin(\pi/180\cdot\alpha)\cdot(1+h\cdot\sin(i\cdot\pi/180\cdot\alpha))$$

where, with no change,
 h=0.4
 i=1
while the function for x has remained unchanged, viz.

$$x(\alpha)=\alpha+a\cdot(1-b\cdot\cos(c\cdot\pi/180\cdot\alpha))+d\cdot(1-e\cdot\cos(f\cdot\pi/180*\alpha))$$

where, without change,
 a=1.2
 c=3
 d=0.4
 e=12
 f=5 but with a choice of b=4 instead of 16 as previously. This clearly shows that a reduction in b reduces the sharpness of the recesses.

To the skilled worker, of course, there are also further minor variations possible without departing from the scope of protection of the invention. More particularly, h might also be chosen larger, in order to make the projections flatter (exceeding the 0.5 centrally in the projection might give rise to a depression) or else somewhat smaller, which leads to gothic-like pointed arches and may be appropriate if the initial splitting proves less problematic in comparison to the transition to ongoing splitting. With i=0.2 instead of 1 it would also be possible for far more complex families to form than the three shown in the previous example.

FIG. 6 shows, to scale, in a representation similar to that of FIG. 1, the adhesive tape edges that result from the plot shown in FIG. 5 by compression of the y axis. It is clearly apparent from the outermost points z of the recesses Z (these terms always refer to the leading edge, which—in analogy to FIG. 1—is in this case the right edge r) that here there is now a gentler curvature with a gentler notching effect in relation to tension in the longitudinal direction in this splittable adhesive tape 1. The same recesses appear at the other edge 1 as projections.

FIG. 7 shows, on a 1:1 scale, in a plan view, a further adhesive tape having a carrier made from one-piece splittable paper. Here as well the two edges of the splittable adhesive tape are inventively wavy, specifically having projections V which are of rounded configuration at their most far-forwardly projecting points v. In order to generate and mathematically describe these cut curves, semicircles are simply placed against one another in alternation. The respective semicircle radius here is 5 mm and is therefore also the wave amplitude, while the wavelength is four times this figure, i.e., 2 cm.

A wave profile of this kind first of all has the advantage of being much easier to produce by hand for very first sample specimens, in order to be able to demonstrate in principle the functional capacity of the invention, which initially came about in purely abstract form.

In relation to the width of the adhesive tape of 1 cm, therefore, the wave amplitude here is chosen to be very large; this is done on the one hand in order to be able to make the demonstration with a particularly large effect (to get a lot out, put a lot in) despite a highly simplified curve profile, and on the other hand because the resultantly conflicting concerns of applicability first to the underside of an adhesive splicing tape and then, together with this tape, to a new roll of web material need not play any part as far as the initial laboratory experiments are concerned.

Irrespective of what grade of paper has been used to produce the carrier made wavy in this way—a number of types were trialed, including commercial copier paper of the brand "Plano Dynamic Office" from the manufacturer Schneider und Söhne—the initial splitting resistance and hence the maximum in the splitting force profile was lowered to approximately 40% of the figure which comes about in the case of straight edges.

An adhesive tape in this configuration corresponds not only to the requirements of claim 1 but also to those of the edge-describing claims 8 and 9 and also, preferably, of the further claims 10 and 11. In spite of its (one-off) continual differentiability, however, this different curve profile has only one inflection point per flank, whereas the edge profiles shown in FIGS. 1 to 6 have three inflection points per flank.

In order to arrive at a functional test that was as realistic as possible for subsequent practice, the splittable adhesive strip designed in accordance with FIG. 7 was first married to a 50 mm wide adhesive splicing tape, with an offset between the leading edges of the adhesive splicing tape on the one hand and the splittable adhesive tape on the other hand of 2 mm, as described in more detail by EP 1 022 245. Furthermore, for the purpose of comparison with the known prior art, an identical adhesive splicing tape with the same offset, with a straight-edged splittable adhesive tape on the underside, was married to materials which were otherwise the same.

FIG. 8, in a diagram, shows the splitting force profile—that is, the splitting force over the peeled path—of the aforementioned tape assembly with straight edges on the splittable lower adhesive tape. On following the graph over the specified splicing tape width of 50 mm, the first thing apparent is a steep increase from about 14 mm, with an absolute maximum at 17 mm, at almost 5 scale divisions of the y axis.

FIG. 9, in a diagram analogous to that of FIG. 8, shows the splitting force profile for a paper strip having an inventively waved edge, specifically with an edge according to FIG. 7. All other properties of the test specimen and of the experimental conditions are unchanged, so that comparison with FIG. 8, which is illustrative of the prior art, is allowable. (The different scale that came about by chance in the course of copying has no technical significance; scale division here is the same as in FIG. 8.)

The fact that the force line in both diagrams rises more gently than abruptly even after the said 2 mm edge offset has a lot less to do with the behavior of the splittable strip under investigation, itself, than with the elasticities in the experimental apparatus. Also contributing to this are the paper web sections cited on either side of the test specimen, which—despite the disadvantage of their elasticity—are rational on account of the advantage of a realistically uniform introduction of force into the test specimen over its total extent. In conceptual terms, therefore, the appropriate approach for physical analysis is to act as if the zero point of the x axis were to lie at the point of this first relative force maximum.

The prior art line shows in very pronounced terms at x=17 mm a first maximum, which is not only a relative maximum but also an absolute maximum. Its height is approximately 4.8 scale divisions of the y axis.

No absolute dimensions have been given to the y axis in either diagram, first because the dimension which would otherwise have to be inserted there is dependent on the peel speed (for this experiment, 300 mm per minute were chosen) and also on the paper grade and the width of the roll to be prepared for splicing therewith. The splitting resistances per unit width of the paper used as a carrier for the splittable adhesive tape may be between 10 and 100 cN per cm, depending on the intended use. In the diagram according to FIG. 9 the beginning of splitting is at x=18 mm, but is apparent only weakly there, since it is situated only at a height of 1.6 scale divisions. A slight increase in the splitting force profile is evident in the vicinity of x=22 mm, and is ascribable to the increased energy required for ongoing splitting. At the point x=28 mm, the absolute maximum of this splitting force profile is apparent, at a height of 2.2 scale divisions. Consequently this absolute maximum of the inventive version under investigation is situated at less than half of the existing version with straight edges.

The height and position of this maximum appear to correlate with the circumstance that, after a splitting path of 10 mm, not only is the outermost point of the recesses assigned to the leading edge but also the end of the split strip is assigned to the trailing edge.

FIG. 10 shows, in an end-face view, an adhesive splicing tape of the invention, consisting essentially of a carrier 7 and a top adhesive layer 6 which to start with is covered by two liners 8 and 9 consisting preferably, in a manner known per se, of siliconized paper. Fastened to the underside of the adhesive splicing tape is a splittable adhesive tape 1 of the invention with wavelike edges l and r (preferably "l and r", although this is difficult to elicit from this word-processing system); in this case—in a way which is particularly simple and fully functional—this fixing is brought about by the splittable adhesive tape 1 having not only a layer 3 of self-adhesive composition on its underside but also a layer 4 of self-adhesive composition on its top face. For reasons of cost it is preferred for the adhesives of layers 3 and 4 to be the same; on the contrary, the adhesive 6 on the top face of the adhesive splicing tape is preferably chosen differently, namely for a very rapid development of adhesion over time. In a manner known per se, the underside of the splittable adhesive tape, moreover, is covered with a further liner 5.

The most obvious feature of the invention, the wavy shaping of the splittable adhesive tape 1 with its splittable paper carrier 2, is also apparent in the end-face view, more specifically at the doubly appearing left edge. With particular preference—as shown here—the adhesive splicing tape is cut to length during application to the roll that is to be prepared, this cutting taking place in such a way that the cut passes through a leading projection, since in this way the risk of edge creasing is minimized. This is the reason why there is no doubling evident here at the right leading edge.

As is familiar per se to the skilled worker, the way in which the adhesive splicing tape elucidated in FIG. 10 is employed is that first of all, from the new roll to be prepared, the start of the radially outer turn 11 is raised or folded back, after which the liner 5 is removed from the underside and then the adhesive splicing tape, made ready for bonding in this way, is adhered at least substantially axially in the vicinity—if in doubt, set back a few cm—of the end of the roll. Preferably this adhesive tape is aligned exactly axially, a measure which on the one hand prevents transverse displacements and on the other hand can now also be managed, as a result of the much better distribution of the splitting energy over the length of the web, by virtue of the invention.

Thereafter the trailing liner 8 of the adhesive splicing tape is removed, thereby exposing the trailing part of the adhesive surface 6, and then the initially raised or folded-back start 11 of the roll is applied to the area ready for adhesion. In general, after this, there will be some paper standing proud beyond the front edge of the adhesive area (in any case the converse situation must not occur), with this edge of the adhesive area specifically occurring at the point where there was, formerly, the separating join between the two liners 8 and 9. The edge of the paper standing proud is then appropriately folded back with a sharp crease and then separated off using a sharp blade which is guided in the crease fold. Then, after that, the leading liner 9 as well is removed, so that now the leading part of the adhesive area 6 is exposed.

It is precisely this situation which is shown by FIG. 11 on a paper roll 10. This FIG. 11 is a view—not true to scale—from the side onto the new paper roll 10, which is visible in a sectional view. The start of this roll is now sealed—it can be easily opened in accordance with the invention—and hence has been made ready for the acceleration of the roll 10 to a rotational speed such that the speed at the periphery of the roll corresponds to the running speed of the expiring web.

In the same way as the (main) carrier 7, which accommodates the tape tension in the newly extended web, is appropriately matched precisely to the material that is to be joined, and the adhesives used are matched to the time available for development of bond strength, and the size of adhesive area that is realized is in turn again matched to the cohesiveness of that adhesive, thus it is also necessary to match the splittable adhesive tape 1, more particularly its initial splitting resistance, as precisely as possible to the web material that is to be joined. The more sensitive this material, the lower the level at which the initial splitting resistance must be chosen. The power of the invention lies essentially in the fact that the skilled worker is enabled not only to purposely develop the splittable paper from which the carrier 2 of the splittable adhesive tape 1 is manufactured but also to open up a potential for improvement at the edge contour. In initial experiments, this potential proved so great that, indeed, paper of somewhat higher initial splitting resistance can again be used. A high consistency of quality is more readily achievable hereby, and, moreover, it would be possible in this way to accommodate even higher centrifugal forces during acceleration, which would permit higher machine running speeds even with such sensitive material as high-gloss gravure paper.

Owing to the narrow interaction disclosed between the splittable adhesive tape and the other components of the adhesive splicing tape and with the new roll to be equipped therewith, it appears to be justified to seek protection also for an adhesive splicing tape of this kind and for a new roll prepared therewith for splicing, as is done by claims 10 and 11.

Since an edge profile of this kind also does not appear to have been already known for any other material in web form, the tool for cutting such nonlinear edges in an adhesive tape also appears to be new. This tool embodies the curved lines that have been found and also the edges of the splittable adhesive tape. Therefore protection appears justified for this tool as well.

To conclude, a word on certain terms in the technical jargon, which is not always systematic:

"Adhesive splicing tape", which is used by experts, unfortunately, not only for the adhesive tape which adheres only at the top, with the carrier 7, but also for the tape system present after the marriage and made up of this adhesive splicing tape, which in general is produced independently first, with the splittable adhesive tape. In the particular context, however, it is clear what is meant. Where reference is made to the tape system, the carrier 7 is also readily referred to as the main carrier, since, indeed, the tape system also possesses a second carrier, namely the easily split carrier.

The term "easily split" refers to splittability, or a capacity to split.

The following list of reference symbols is part of the description:

List Of Reference Symbols:
1 splittable adhesive tape
2 carrier of 1
3 lower self-adhesive layer of 1
4 upper self-adhesive layer of 1
5 liner on the underside of the splittable adhesive tape
6 upper adhesive layer of the adhesive splicing tape
7 (main) carrier of the adhesive splicing tape
8 trailing liner of the adhesive splicing tape, preferably silicone paper
9 leading liner of the adhesive splicing tape, preferably silicone paper
10 new roll of web material, e.g., high-gloss gravure paper
11 outer turn of the new roll
l left boundary edge of 1
r right boundary edge of 1
ü transition region
v furthest-projecting part of V; a critical factor of the invention, indeed, is a rounding for the purpose of blunting or flattening the points which were formerly provided there
w inflection points on the flanks of the wavy edges l and r of 1
z most greatly recessed points on Z, i.e., between pairs of projections V
V projections on the—inventively nonlinear—boundary edge of the splittable adhesive tape which lead during the acceleration of the new roll in proper use
$V_1$ this sub-term to V refers to projections of a first family which possess the common property of projecting to an equal extent, which is in fact greater than projections $V_2$
$V_2$ this sub-term to V refers to projections of a second family which possess the common property of projecting to an equal extent, which is in fact to less of an extent than projections $V_1$
Z recesses on the boundary edge of the splittable adhesive tape of the invention which lead during the acceleration of the new roll in proper use.

The invention claimed is:

1. An adhesive tape having a length, a width and a thickness, a plane defined by the length and the width, and a left boundary edge and a right boundary edge, wherein the adhesive tape is adapted to split completely substantially parallel to said plane, wherein at least one of the left boundary edge and the right boundary edge is a nonlinear edge, and wherein at least one nonlinear edge has projections that are rounded at their furthest-projecting points.

2. The splittable adhesive tape of claim 1, wherein the at least one nonlinear edge at its furthest-recessed points are rounded, but at these points the curvature is substantially sharper than at the projecting points.

3. The splittable adhesive tape of claim 1, wherein in each case between a widest projecting point and its closest furthest-recessed point the at least one nonlinear edge is continuously differentiable, with three inflection points.

4. The splittable adhesive tape of claim 1, wherein in each case between a widest projecting point and its closest furthest-recessed point the at least one nonlinear edge is continuously differentiable, with exactly one inflection point.

5. The splittable adhesive tape of claim 4, wherein the at least one nonlinear edge is composed of an alternating sequence of semicircles.

6. The splittable adhesive tape of claim 1, wherein the negative of each recess is of narrower design than the positive of an adjacent projection (V).

7. The splittable adhesive tape of claim 1, wherein the at least one nonlinear edge has two or more groups of projections which project to different extents in accordance with a regular pattern.

8. The splittable adhesive tape of claim 1, wherein both edges of the adhesive tape are nonlinear, with the same period length.

9. The splittable adhesive tape of claim 8, wherein its leading edge and its trailing edge extend parallel to one another, so that, in spite of the nonlinearity of the two adhesive tape edges, the adhesive tape width is the same everywhere.

10. The splittable adhesive tape of claim 1, which comprises a single piece paper carrier.

11. The splittable adhesive tape of claim 1, which comprises a self-adhesive composition on at least one of its sides.

12. The splittable adhesive tape of claim 1, comprising an adhesive provided as a layer on one side of the tape yet not on the other side of the tape.

13. The splittable adhesive tape of claim 1, comprising an adhesive provided as a layer on both sides of the tape, wherein the adhesive of each layer is identical or different.

14. The splittable adhesive tape of claim 1, wherein the rounded projections comprise blunt or flattened zones.

15. An adhesive splicing tape comprising an integrated roll fastener, wherein the roll fastener is composed of a splittable adhesive tape according to claim 1.

16. A combination comprising a roll of paper or roll of film and an adhesive splicing tape of claim 15 adhered to said roll.

17. A method for producing a splittable adhesive tape of claim 1, said method comprising:
   a) providing an adhesive tape having a length, a width and a thickness, a plane defined by the length and the width, and a left boundary edge and a right boundary edge, wherein the adhesive tape is designed to split completely substantially parallel and not transversely to said plane, wherein at least one of the left boundary edge and the right boundary edge is a nonlinear edge, and wherein at least one nonlinear edge has projections that are rounded at their furthest- projecting points;
   b) providing a tool comprising a nonlinear cutting or punching edge with projections and recesses, at least the recesses being round; and
   c) using said tool to cut or punch said adhesive tape so that the furthest-projecting points of said projections of said adhesive tape are rounded.

18. The method of claim 17, wherein the rounded projections comprise blunt or flattened zones.

* * * * *

UNITED STATES PATENT AND TRADEMARK OFFICE
CERTIFICATE OF CORRECTION

PATENT NO. : 8,597,751 B2
APPLICATION NO. : 12/091236
DATED : December 3, 2013
INVENTOR(S) : Götz et al.

It is certified that error appears in the above-identified patent and that said Letters Patent is hereby corrected as shown below:

In the specification

Column 10, line 41, "with a given" -- should read -- with α given --.

Column 10, line 54, "d=0.4" -- should read -- c=3 (with d=0.4 on following line) --.

Column 10, line 67, "1=n/8" -- should read -- 1=π/8 --.

Column 14, line 47, "l and r (preferably "l and r", although" -- should read -- l and r (preferably "*l* and *r*", although --.

Signed and Sealed this
Sixth Day of October, 2015

Michelle K. Lee
*Director of the United States Patent and Trademark Office*